(12) United States Patent
Marechal

(10) Patent No.: US 8,360,386 B2
(45) Date of Patent: Jan. 29, 2013

(54) COUPLING SYSTEM FOR AN AIRCRAFT SEAT

(75) Inventor: Xavier Marechal, Paris (FR)

(73) Assignee: Attax, Carrieres sur Seine (FR)

( * ) Notice: Subject to any disclaimer, the term of this patent is extended or adjusted under 35 U.S.C. 154(b) by 148 days.

(21) Appl. No.: 13/047,022

(22) Filed: Mar. 14, 2011

(65) Prior Publication Data
US 2011/0253874 A1 Oct. 20, 2011

(30) Foreign Application Priority Data
Mar. 12, 2010 (FR) ..................................... 10 51795

(51) Int. Cl.
*A47B 97/00* (2006.01)
(52) U.S. Cl. .................. 248/503.1; 244/118.5; 410/101; 410/105
(58) Field of Classification Search .................. 248/503, 248/503.1, 500, 680, 681; 244/118.1, 118.5, 244/119; 410/101, 105
See application file for complete search history.

(56) References Cited

U.S. PATENT DOCUMENTS

| 4,047,689 | A | * | 9/1977 | Grendahl | ..................... 410/105 |
| 4,213,593 | A | * | 7/1980 | Weik | .............................. 248/501 |
| 4,277,043 | A | | 7/1981 | Weik | |
| 4,396,175 | A | * | 8/1983 | Long et al. | ................. 248/503.1 |
| 4,449,875 | A | * | 5/1984 | Brunelle | ......................... 410/80 |
| 4,771,969 | A | * | 9/1988 | Dowd | ........................ 244/118.6 |
| 5,489,172 | A | | 2/1996 | Michler | |
| 5,871,318 | A | * | 2/1999 | Dixon et al. | .................. 410/105 |
| 6,902,365 | B1 | | 6/2005 | Dowty | |
| 7,785,053 | B2 | * | 8/2010 | Hudson | ......................... 410/105 |
| 2007/0228215 | A1 | * | 10/2007 | Hudson et al. | ............. 244/118.1 |

FOREIGN PATENT DOCUMENTS
DE 195 20 959 12/1996

OTHER PUBLICATIONS
Search Report dated Oct. 14, 2010 issued in corresponding French Application No. 10 51795.
Written Opinion issued in corresponding French Application No. 10 51795.

* cited by examiner

Primary Examiner — Anita M King
(74) Attorney, Agent, or Firm — Kenyon & Kenyon LLP

(57) ABSTRACT

In a coupling system for coupling an aircraft seat in a rail of the rest thereof, of the type including a base to which the rest of the seat is connected and associated with a locking slide able to be moved using a control device under the control of a handling lever that can be actuated by an assembly operator, between an assembly/disassembly position and a locking position, the control device includes a device in needle form, which is able to be moved in the base by the lever and whereof one end includes a support surface adapted to cooperate with a complementary ramp surface of the slide to move the latter from its assembly/disassembly position towards its locking position, against the stress from an elastic or spring device.

9 Claims, 2 Drawing Sheets

COUPLING SYSTEM FOR AN AIRCRAFT SEAT

CROSS-REFERENCE TO RELATED APPLICATIONS

The present application claims priority to Application No. 10 51795, filed in the French Republic on Mar. 12, 2010, which is expressly incorporated herein in its entirety by reference thereto.

FIELD OF THE INVENTION

The present invention relates to a coupling system for an aircraft seat, e.g., a coupling system for an aircraft seat in a rail of the rest of the aircraft.

SUMMARY

Example embodiments of the present invention provide a system that includes a base to which the rest of the seat is connected and that is associated with a locking slide that can be moved using a control device under the control of a handling lever able to be actuated by an assembly operator, between an assembly/disassembly position and a locking position.

Various arrangements of the control device may be provided. For example, a connecting rod movement device may be provided.

Example embodiments of the present invention provide a coupling system for coupling an aircraft seat in a rail of the rest thereof, of the type including a base to which the rest of the seat is connected and associated with a locking slide able to be moved using a control device under the control of a handling lever that can be actuated by an assembly operator, between an assembly/disassembly position and a locking position. The control device may include a needle, which is able to be moved in the base by the lever and whereof one end includes a support surface adapted to cooperate with a complementary ramp surface of the slide to move the latter from its assembly/disassembly position towards its locking position, against the stress from an elastic device.

The elastic device may be inserted between one of the ends of the slide and a complementary stop surface of the base. For example, the elastic device may include a helical spring.

The needle may be associated with an elastic stress device. The elastic device may include a helical spring and an elastic sleeve arranged around the needle device.

The front face of the slide may include a support stop on a complementary stop device of the base.

The end of the needle device associated with the lever may include lateral wings adapted to cooperate with guide grooves thereof formed in the lever.

Further features and aspects of example embodiments of the present invention are described in more detail below with reference to the appended Figures.

DETAILED DESCRIPTION

Figure 1:
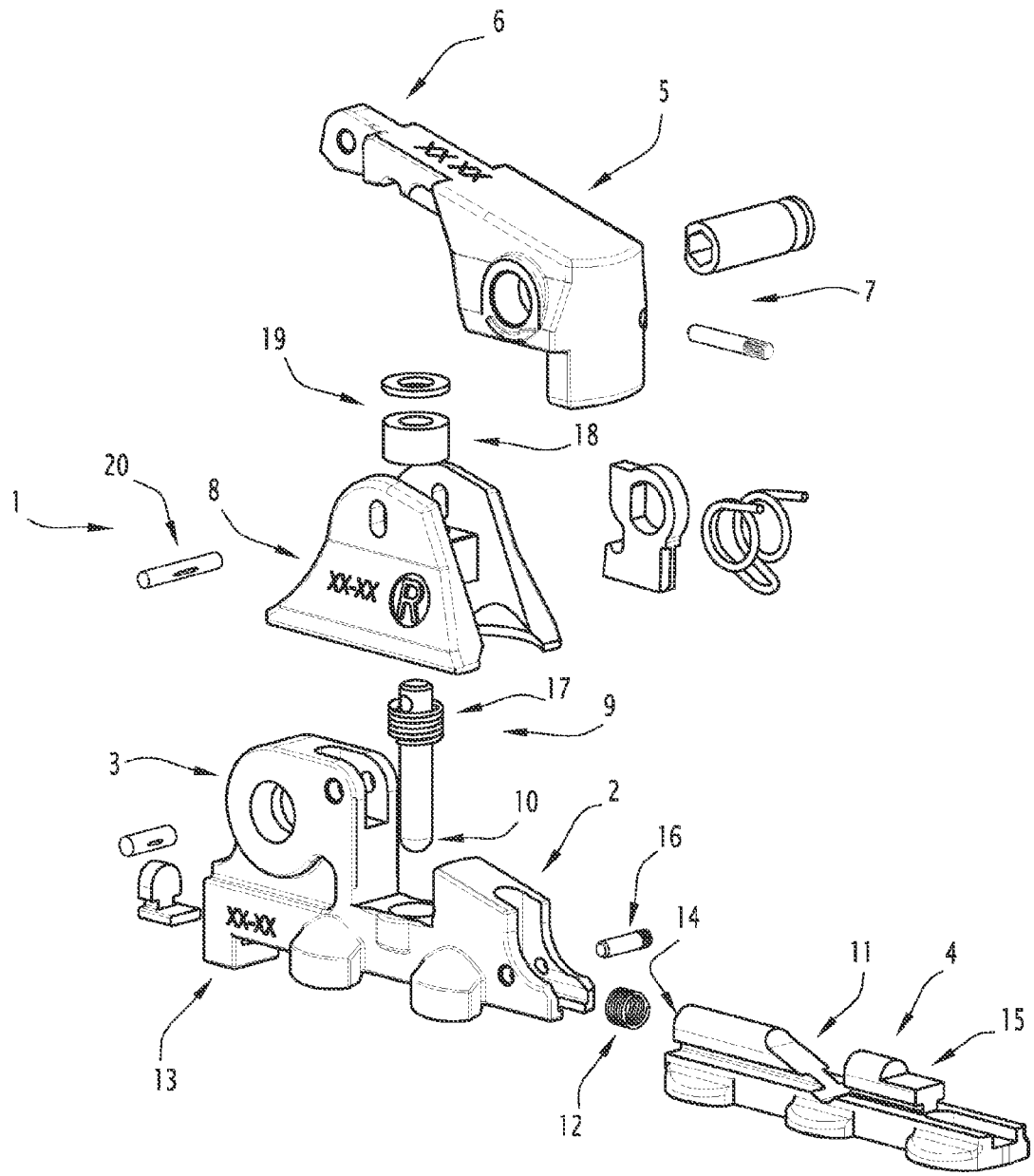
FIG. 1 shows an exploded perspective view of a coupling system according to an example embodiment of the present invention.
Figure 2:
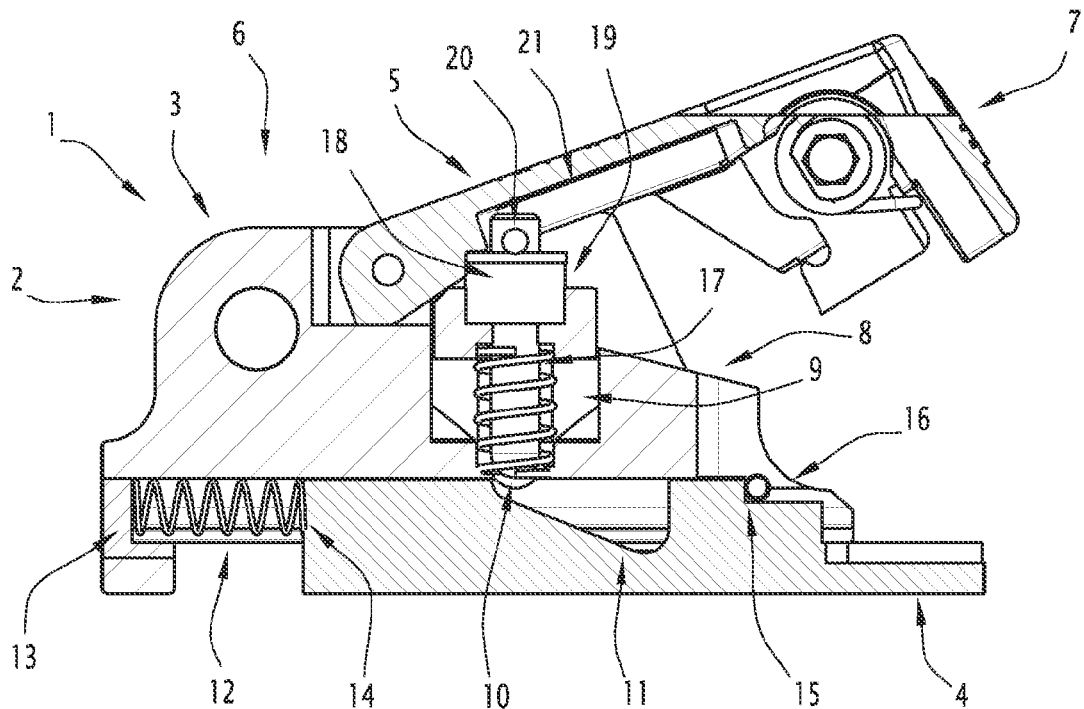
FIGS. 2 and 3 show cross-sectional side views of such a system in the assembly/disassembly position and in the locking position, respectively.
Figure 3:
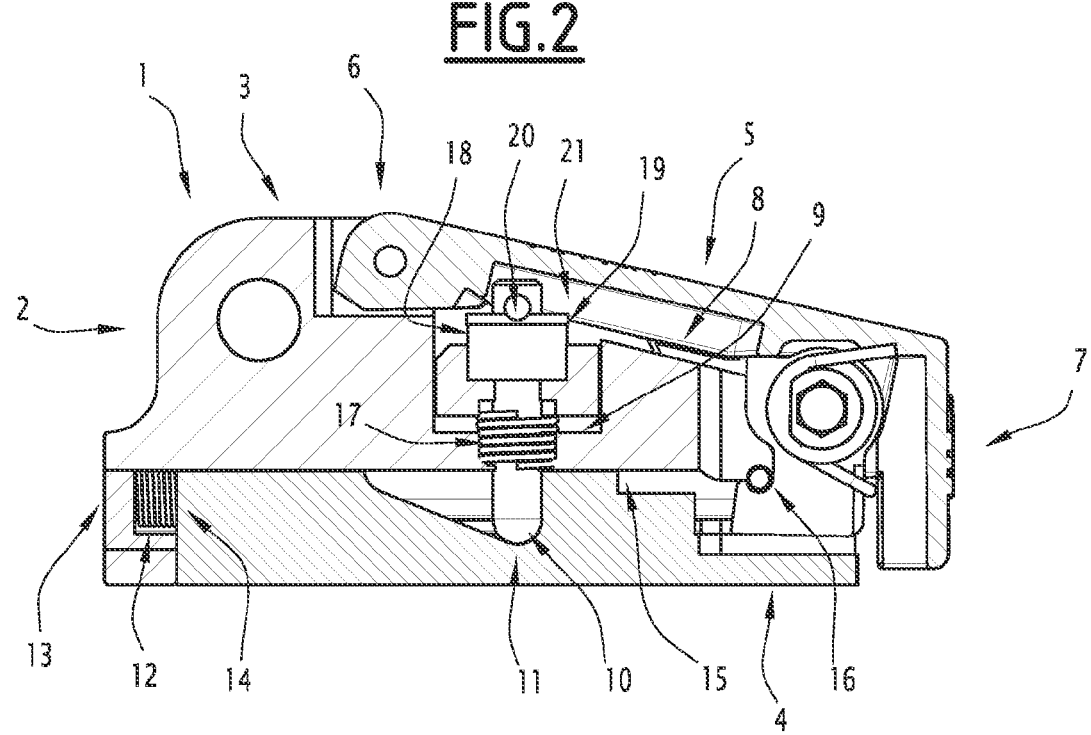

FIGS. 1 to 3 illustrate a coupling system of an aircraft seat in a rail of the rest thereof.

The system is designated by general reference 1 in the Figures and includes a base designated by general reference 2, to which the rest of the seat is connected. To that end, the base for example includes a holding ring for the rest of the seat designated by general reference 3.

This base is associated with a locking slide designated by general reference 4, movable via a control device under the control of a handling lever that can be actuated by an assembly operator, between an assembly/disassembly position as illustrated in FIG. 2 and a locking position as illustrated in FIG. 3.

As illustrated in the Figures, the handling lever that can be actuated by the assembly operator is designated by general reference 5 and is articulated at one of its ends, for example 6, on the base. The other end of this lever, for example designated by general reference 7, includes detachable device for locking the lever in the locking position. The locking device can for example be disengaged using a quarter turn mechanism that the operator can actuate.

As previously indicated, a control device is arranged between this handling lever and the locking slide to move the slide under the action of the lever.

The control device is designated by general reference 8 in the Figures and in particular includes a device in needle form designated by general reference 9, for example movable vertically in the base via the lever, as illustrated.

The needle device has a first end adapted to cooperate with the lever and a second end adapted to cooperate with the slide to move it.

More precisely, the end of the needle device adapted to cooperate with the slide may include a support surface designated by general reference 10, adapted to cooperate with a complementary ramp surface of the slide, this ramp surface being designated by general reference 11 to, as illustrated in these Figures, depending on the movements of the lever and therefore of the needle device in the base, cause a movement of the slide from its assembly/disassembly position illustrated in FIG. 2 towards its locking position illustrated in FIG. 3, against the stress of an elastic device designated by general reference 12.

The elastic device is, for example, formed by a helical spring inserted between the corresponding end of the slide 4 and a complementary stop surface of the base, this complementary stop surface of the base being designated by general reference 13, while the corresponding end of the slide is designated by general reference 14.

The front face of the slide 4 includes a bearing stop designated by general reference 15, adapted to cooperate with a complementary stop of the base for example formed by a rod for holding the locking device for locking the position of the lever.

This rod is for example designated by general reference 16 and is therefore engaged in the base.

As illustrated, for example, in FIG. 3, the rod is also adapted to cooperate with the locking device to lock the lever in the locking position.

It will also be noted that the needle device can be associated with different elastic stress devices arranged therearound. Thus for example, a helical return spring for returning these to the assembly/disassembly position can be provided.

The elastic device formed by the spring is for example designated by general reference 17. Likewise, an elastic sleeve designated by general reference 18 can also be provided in association with the spring, to ensure stress and recovery of the assembly play.

The sleeve is, for example, inserted between lateral protruding parts of the end of the needle device, adapted to cooperate with the lever and a support sleeve 19 associated with the spring 17.

As illustrated, the corresponding end of the needle device can include lateral protruding parts, for example formed by the ends of a support rod 20, engaged in the corresponding end of the needle device, and adapted to cooperate with complementary guide grooves of that lever, formed in the lever and designated by general reference 21 in FIGS. 2 and 3. One then sees that in the assembly/disassembly position as illustrated in FIG. 2, the elastic device 12 pushes the slide towards its assembly/disassembly position, the handling lever being in the upper position.

The assembly operator can then engage the hooking system in the rail of the rest of the aircraft.

Once the system is in this position engaged with the rail, the assembly operator pushes on the handling lever 5, which causes the needle device 9 to be lowered in the base, which therefore pushes the slide back via the ramp part thereof, against the stress from the spring 12, towards its locking position.

This lowering of the lever continues until the locking device for locking the position of the lever moves to the active position. The system and the seat are then locked in position.

When the assembly operator wishes to unlock the assembly, he then actuates the locking device, for example, via the quarter turn mechanism to unlock the locking device and release the lever, the elastic device associated with the needle device and the slide causes the slide to advance towards its assembly/disassembly position and the lever to rise towards its assembly/disassembly position.

What is claimed is:

1. A coupling system for coupling an aircraft seat in a rail, comprising:
   a base adapted to connect to the seat;
   a locking slide;
   a lever operable by an assembly operator;
   a control device adapted to move the locking slide, in accordance with operation of the lever, between an assembly/disassembly position and a locking position;
   wherein the control device includes a needle movable in the base by the lever, one end of the needle including a support surface adapted to cooperate with a complementary ramp surface of the slide to move the slide from the assembly/disassembly position toward the locking position, against stress from an elastic device.

2. The aircraft seat coupling system according to claim 1, wherein the elastic device is arranged between one end of the slide and a complementary stop surface of the base.

3. The aircraft seat coupling system according to claim 2, wherein the elastic device includes a helical spring.

4. The aircraft seat coupling system according to claim 2, wherein the elastic device includes a spring.

5. The aircraft seat coupling system according to claim 1, further comprising an elastic stress device associated with the needle.

6. The aircraft seat coupling system according to claim 1, further comprising a spring associated with the needle.

7. The aircraft seat coupling system according to claim 5, wherein the elastic stress device includes a helical spring and an elastic sleeve arranged around the needle.

8. The aircraft seat coupling system according to claim 1, wherein a front face of the slide includes a support stop on a complementary stop of the base.

9. The aircraft seat coupling system according to claim 1, wherein an end of the needle associated with the lever includes lateral wings adapted to cooperate with guide grooves formed in the lever.

* * * * *